(12) United States Patent
Reznicek et al.

(10) Patent No.: US 12,464,957 B2
(45) Date of Patent: Nov. 4, 2025

(54) TEXTURED COBALT ALUMINUM/MAGNESIUM-ALUMINUM-OXIDE PEDESTAL FOR MEMORY DEVICES

(71) Applicant: International Business Machines Corporation, Armonk, NY (US)

(72) Inventors: Alexander Reznicek, Troy, NY (US); Guohan Hu, Yorktown Heights, NY (US); Matthias Georg Gottwald, Ridgefield, CT (US); Stephen L Brown, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 18/137,188

(22) Filed: Apr. 20, 2023

(65) Prior Publication Data

US 2024/0357942 A1    Oct. 24, 2024

(51) Int. Cl.
| | | |
|---|---|---|
| *H10N 50/80* | (2023.01) | |
| *H01F 10/32* | (2006.01) | |
| *H10B 61/00* | (2023.01) | |
| *H10N 50/01* | (2023.01) | |
| *H10N 50/20* | (2023.01) | |
| *H10N 50/85* | (2023.01) | |

(52) U.S. Cl.
CPC ......... *H10N 50/80* (2023.02); *H01F 10/3259* (2013.01); *H10B 61/00* (2023.02); *H10N 50/01* (2023.02); *H10N 50/20* (2023.02); *H10N 50/85* (2023.02)

(58) Field of Classification Search
CPC ........ H10N 50/80; H10N 50/20; H10N 50/01; H10N 50/85; H10B 61/00; H01F 10/3259
See application file for complete search history.

(56) References Cited

U.S. PATENT DOCUMENTS

| | | |
|---|---|---|
| 7,488,609 B1 | 2/2009 | Lin et al. |
| 10,622,548 B2 | 4/2020 | Sasaki |
| 11,527,275 B2 | 12/2022 | Lin et al. |

(Continued)

FOREIGN PATENT DOCUMENTS

WO    2016024403 A1    2/2016

OTHER PUBLICATIONS

Lee, J. E., et al., "Improved Magnetic Tunnel Junction With Amorphous Seed Layer, Surface Treatment, and High-Polarization Magnetic Materials", IEEE Transactions on Magnetics, Jul. 2004, 3 pages, vol. 40, No. 4.

*Primary Examiner* — Richard A Booth
(74) *Attorney, Agent, or Firm* — Scully, Scott, Murphy & Presser, P.C.; Yuanmin Cai

(57) ABSTRACT

A memory device including a pedestal structure containing a cobalt aluminum layer and a magnesium-aluminum-oxide containing base layer both of which have a (001) crystal orientation is provided. The memory device further includes a magnetic tunnel junction (MTJ) pillar containing an ordered alloy forming an interface with the cobalt aluminum alloy layer. The use of the structural and textural engineered pedestal structure provides improved control of resistance, as well as improved magnetic properties such as higher tunnel magnetoresistance (TMR) and higher perpendicular magnetic anisotropy (PMA), and closer distribution of the ordered alloy.

20 Claims, 3 Drawing Sheets

(56) References Cited

U.S. PATENT DOCUMENTS

| | | | |
|---|---|---|---|
| 11,706,998 B2 * | 7/2023 | Kim | G11C 11/161 |
| | | | 257/421 |
| 2006/0176735 A1 | 8/2006 | Yuasa | |
| 2022/0223783 A1 | 7/2022 | Jeong et al. | |
| 2024/0244982 A1 * | 7/2024 | Hu | H10N 50/10 |
| 2024/0290368 A1 * | 8/2024 | Mertens | H10N 50/10 |
| 2025/0107453 A1 * | 3/2025 | Hu | H10B 61/00 |

* cited by examiner

TEXTURED COBALT ALUMINUM/MAGNESIUM-ALUMINUM-OXIDE PEDESTAL FOR MEMORY DEVICES

BACKGROUND

The present application relates to a memory device, and more particularly to a spin-transfer torque magnetic random access memory (STT-MRAM) device.

Magnetic random access memory (MRAM) is a non-volatile random access memory technology in which data is stored by magnetic storage elements. These elements are typically formed from two ferromagnetic plates, each of which can hold a magnetization, separated by a thin dielectric layer (i.e., a tunnel barrier layer). One of the two plates (i.e., the magnetic reference or pinned layer) is a magnet whose magnetic moment direction is set to a particular direction; the other plate's (i.e., the magnetic free layer's) magnetization can be changed in at least two different directions, representing different digital states such as 0 and 1 for memory applications. In MRAMs, such elements may be referred to as a magnetic tunnel junction (MTJ) pillar. In a typical MTJ pillar, the magnetization of the magnetic reference layer is fixed in one direction (say pointing up), while the direction of the magnetic free layer can be "switched" by some external forces, such as a magnetic field or a spin-torque generating charge current. A smaller current (of either polarity) can be used to read the resistance of the device, which depends on the relative orientations of the magnetizations of the magnetic free layer and the magnetic reference layer. The resistance is typically higher when the magnetizations are anti-parallel, and lower when they are parallel (though this can be reversed, depending on the material).

One type of MRAM that can use a MTJ structure is spin-transfer torque (STT) MRAM. STT MRAM has the advantages of lower power consumption and better scalability over conventional MRAMs which use magnetic fields to flip the active elements. In STT MRAM, spin-transfer torque is used to flip (switch) the orientation of the magnetic free layer. For a STT MRAM device, a current passing through the MTJ pillar is used to switch, or "write" the bit-state of the MTJ memory element. A current passing down through the MTJ pillar makes the magnetic free layer parallel to the magnetic reference layer, while a current passing up through the MTJ pillar makes the magnetic free layer anti-parallel to the magnetic reference layer.

Advanced STT MRAM applications require fast switching times (on the order of less than 10 nanoseconds, ns), the most advanced application of STT MRAM for last level cache or embedded dynamic access memory (eDRAM) replacement require switching times of approximately 2 ns. MTJ pillars providing STT MRAM devices with such fast switching times need to have a low magnetic moment, while still providing a sufficiently high tunnel magnetoresistance (TMR).

Traditional magnetic free layers such as, for example, CoFeB magnetic free layers, do not support high switching speed because CoFeB and other like magnetic free layers have too high a magnetic moment. This is an intrinsic property and cannot be further engineered.

Ordered magnetic alloys such as, for example, Heusler alloys, are promising materials for fast switching as they provide the required magnetic properties. Growing ordered magnetic alloy free layers is however challenging. Many ordered magnetic alloys like Heusler alloys require highly textured and ordered seed layer materials. The seed layer has to force the ordered magnetic alloy into the desired tetragonal structure, and the seed layer needs to have a lattice constant which provides strain to the ordered magnetic alloy. Additionally, it is desired to have the ordered magnetic alloy free layer tensile strained, as the spin polarization of the strained ordered magnetic alloy, such as for example, $Mn_3Ge$, increases compared to the bulk, i.e., non-tensile strained, ordered magnetic alloy. High spin polarization is needed for fast readout at low read bias and low read current.

SUMMARY

A memory device including a pedestal structure containing a cobalt aluminum layer and a magnesium-aluminum-oxide containing base layer both of which have a (001) crystal orientation is provided. The memory device further includes a MTJ pillar containing an ordered alloy forming an interface with the cobalt aluminum alloy layer. The use of the structural and textural engineered pedestal structure provides improved control of resistance, as well as improved magnetic properties such as higher TMR and higher perpendicular magnetic anisotropy (PMA), and closer distribution of the ordered alloy.

In the present application, the magnesium-aluminum-oxide containing base layer is made by co-depositing MgO and $Al_2O_3$ onto a MgO seed layer having a (100) crystal orientation and thereafter annealing.

In one aspect of the present application, a memory device is provided. In one embodiment, the memory device includes a pedestal structure including a cobalt aluminum layer located on a first surface of a magnesium-aluminum-oxide containing base layer, and a MTJ pillar located on the cobalt aluminum layer of the pedestal structure. In accordance with the present application, the MTJ pillar includes a magnetic free layer composed of an ordered magnetic alloy forming an interface with the cobalt aluminum layer of the pedestal structure. In accordance with the present application, the cobalt aluminum layer has a (001) crystal orientation.

In some embodiments of the present application, the pedestal structure further includes an amorphous template layer located on a second surface of the magnesium-aluminum-oxide containing base layer, wherein the second surface of the magnesium-aluminum-oxide containing base layer is opposite the first surface of the magnesium-aluminum-oxide containing base layer.

In some embodiments of the present application, the memory device further includes a first electrode layer contacting the amorphous template layer, and a second electrode layer contacting the MTJ pillar.

In some embodiments of the present application, the first electrode layer is an amorphous Ta/TaN layered structure.

In some embodiments of the present application, the memory device further includes an interconnect level contacting a surface of the first electrode layer.

In some embodiments of the present application, the magnetic free layer is tensile strained. The tensile strained magnetic free layer has a higher spin polarization as compared to its' non-strained counterpart.

In some embodiments of the present application, the magnesium-aluminum-oxide containing base layer includes stoichiometric magnesium-aluminum-oxide having a formula $MgAl_2O_4$.

In some embodiments of the present application, the magnesium-aluminum-oxide containing base layer includes an aluminum rich magnesium-aluminum-oxide having a formula MgAl$_y$O$_x$, wherein x is 1 to 1+1.5×y, and y is 1 to 4.

In some embodiments of the present application, the cobalt aluminum layer has a cubic crystal structure. In some embodiments, the cubic crystal structure might be one that is known as a CsCl structure.

In some embodiments of the present application, the magnesium-aluminum-oxide containing base layer also has the (001) crystal orientation.

In some embodiments of the present application, the ordered magnetic alloy is a Heusler alloy.

In some embodiments of the present application, the Heusler alloy includes Mn$_3$Ge, Mn$_3$Ga, Mn$_3$Sn, Mn$_3$Sb, Co$_2$MnSn, or Co$_2$MnSi.

In some embodiments of the present application, the MTJ pillar further includes a magnetic reference layer and a tunnel barrier layer, wherein the tunnel barrier layer is positioned between the magnetic free layer and the magnetic reference layer.

In some embodiments of the present application, the magnetic reference layer is a multilayered structure including a synthetic anti-ferromagnetic coupling layer sandwiched between a first magnetic reference layer and a second magnetic reference layer.

In some embodiments of the present application, the ordered magnetic alloy is Mn$_3$Ge, the magnesium-aluminum-oxide containing base layer includes stoichiometric magnesium-aluminum-oxide having a formula MgAl$_2$O$_4$, and the MTJ pillar further includes a magnetic reference layer and a tunnel barrier layer, wherein the tunnel barrier layer is positioned between the magnetic free layer and the magnetic reference layer, and wherein the magnetic reference layer is a multilayered structure including a synthetic anti-ferromagnetic coupling layer sandwiched between a first magnetic reference layer and a second magnetic reference layer, and further wherein both the magnesium-aluminum-oxide containing base layer and the cobalt aluminum layer have a (001) crystal orientation.

In some embodiments of the present application, the ordered magnetic alloy is Mn$_3$Ge, the magnesium-aluminum-oxide containing base layer includes an aluminum rich magnesium-aluminum-oxide having a formula MgAl$_y$O$_x$, wherein x is 1 to 1+1.5×y, and y is 1 to 4, and the MTJ pillar further includes a magnetic reference layer and a tunnel barrier layer, wherein the tunnel barrier layer is positioned between the magnetic free layer and the magnetic reference layer, and wherein the magnetic reference layer is a multilayered structure including a synthetic anti-ferromagnetic coupling layer sandwiched between a first magnetic reference layer and a second magnetic reference layer, and further wherein both the magnesium-aluminum-oxide containing base layer and the cobalt aluminum layer have a (001) crystal orientation.

In another embodiment of the present application, the memory device includes a pedestal structure including a cobalt aluminum layer located on a first surface of a magnesium-aluminum-oxide containing base layer, and a MTJ pillar located on the cobalt aluminum layer of the pedestal structure. In accordance with this embodiment of the present application, the MTJ pillar includes a magnetic free layer composed of manganese containing Heusler alloy and forming an interface with the cobalt aluminum layer of the pedestal structure, wherein both the magnesium-aluminum-oxide containing base layer and the cobalt aluminum layer have a (001) crystal orientation.

In some embodiments of the present application, the manganese containing Heusler alloy is one of Mn$_3$Ge, Mn$_3$Ga, Mn$_3$Sn, Mn$_3$Sb, Co$_2$MnSn, or Co$_2$MnSi.

In some embodiments of the present application, the magnesium-aluminum-oxide containing base layer includes stoichiometric magnesium-aluminum-oxide having a formula MgAl$_2$O$_4$.

In some embodiments of the present application, the magnesium-aluminum-oxide containing base layer include an aluminum rich magnesium-aluminum-oxide having a formula MgAl$_y$O$_x$, wherein x is 1 to 1+1.5×y, and y is 1 to 4.

DETAILED DESCRIPTION

Figure 1:
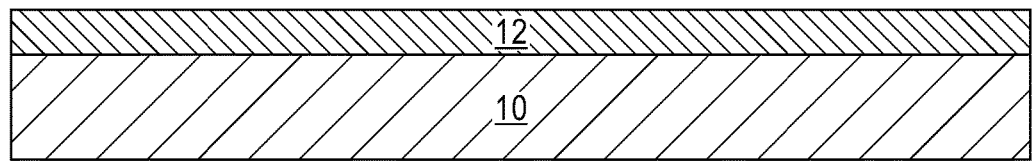
FIG. 1 is a cross sectional view of an exemplary structure that can be employed in the present application, the exemplary structure includes a first electrode layer located on an interconnect level.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

As mentioned above, ordered magnetic alloys such as, for example, Heusler alloys, are promising materials for fast switching as they provide the required magnetic properties. However and as also mentioned above, growing ordered magnetic alloy free layers is challenging. Many ordered magnetic alloys require highly textured and ordered seed layer materials. The seed layer has to force the ordered magnetic alloy into the desired tetragonal structure, and in some cases, the seed layer needs to have a lattice constant which provides strain to the ordered magnetic alloy. Additionally, it is desired to have the ordered magnetic alloy free layer tensile strained, as the spin polarization of the strained ordered magnetic alloy, such as for example, $Mn_3Ge$, increases compared to the bulk, i.e., non-tensile strained, ordered magnetic alloy. High spin polarization is needed to lower the switching current and for a low read current. Magnetic free layers composed of ordered magnetic alloys need to be grown on a crystalline template having a lattice constant that is larger than the ordered magnetic alloy itself so as to facilitate the ordered growth of the alloy. Stoichiometric CoAl alloy (50:50 atomic ratio, non-magnetic alloy) is a template which allows the growth of ordered magnetic alloys such as, for example, $Mn_3Ge$, and it has a lattice constant of 4.03 Å (which is higher than the lattice constant of $Mn_3Ge$ which is 4 Å), which allows for the formation of tensile strained $Mn_3Ge$.

One problem with a traditional MgO/CoAl seed system is aluminum diffusion into the seed layer of the MTJ pillar. The diffused aluminum attracts oxygen from the seed layer leading to increased resistance (RA) and reduced TMR. Additionally, the aluminum diffusion will leave behind a cobalt rich CoAl seed layer at the interface, which could be magnetic. This uncontrolled magnetic sub-layer can negatively impact device performance and distribution.

As stated above, a memory device including a pedestal structure containing a cobalt aluminum layer and a magnesium-aluminum-oxide containing base layer both of which have a (001) crystal orientation is provided. The memory device further includes a MTJ pillar containing an ordered magnetic alloy forming an interface with the cobalt aluminum alloy layer. As also mentioned above, the use of the structural and textural engineered pedestal structure provides improved control of resistance, as well as improved magnetic properties such as higher TMR and higher PMA, and closer distribution of the ordered magnetic alloy. These and other aspects of the present application will now be described in greater detail.

In the present application, the magnesium-aluminum-oxide containing base layer is made by co-depositing MgO and $Al_2O_3$ onto a MgO seed layer having a (100) crystal orientation and thereafter annealing. The co-deposition forms a (001) textured magnesium-aluminum-oxide layer upon the MgO seed layer. This texture is further enhanced during the anneal, the anneal can mix the as-deposited magnesium-aluminum-oxide layer and the MgO seed layer. The base layer includes a composite/blend of the co-deposited magnesium aluminum oxide, i.e., the (001) textured magnesium-aluminum-oxide layer, and the MgO seed layer. In other embodiments, the base layer includes a composite/blend of the co-deposited magnesium aluminum oxide, i.e., the (001) textured magnesium-aluminum-oxide layer, an aluminum layer (that is deposited on the MgO seed layer) and the MgO seed layer.

When the MgO seed layer is deposited on an amorphous template layer such as, for example, CoFeB, it naturally forms a highly textured (001) oriented structure by itself. The MgO seed layer has a face-centered cubic (fcc) crystal structure with a lattice constant of 4.25 Å. Co-depositing MgO and $Al_2O_3$ onto such a MgO seed layer forms magnesium aluminum oxide, $MgAl_2O_4$, which is also fcc structured. The magnesium-aluminum-oxide layer that is formed continues the (001) oriented structure of the MgO seed layer. Depositing $MgAl_2O_4$ itself or only $Al_2O_3$ will not form the (001) oriented texture. The initial MgO seed layer is still needed. The co-deposited magnesium-aluminum-oxide layer has a lattice constant of 8.08 Å, which makes it a perfect template for cobalt aluminum (twice the lattice constant of 4.03 Å). Annealing the MgO seed layer prior to the co-depositing step can improve the texture of the resultant co-deposited magnesium-aluminum-oxide layer.

The cobalt aluminum nucleates and epitaxially grows the desired (001) texture due to (1) the aluminum atoms present at the surface, and (2) the perfectly matched lattice spacing. Cobalt aluminum has a cubic structure, and a lattice constant of 2.85 Å. If cobalt aluminum is grown without the right template it grows as a mixture of (001) and (011) crystallites. For $Mn_3Ge$ and other ordered alloy templating only (001) crystals are desired. If the unit cell of the cobalt aluminum is rotated 45 degrees, the lattice spacing in (011) direction is 4.03 Å which makes two unit cells having a lattice distant of 8.06 Å. This is a perfect match to the co-deposited magnesium aluminum oxide layer.

The aluminum containing surface of the (001) textured magnesium aluminum oxide-containing base layer promotes growth of cobalt aluminum. It can further be enhanced by forming an aluminum rich magnesium aluminum oxide, $MgAl_yO_x$, wherein x is 1 to 1+1.5xy, and y is 1 to 4 as the magnesium aluminum oxide containing base layer. The aluminum rich magnesium oxide can be formed by adding a thin aluminum layer on the MgO seed layer prior to the co-deposition process. The aluminum in the magnesium aluminum oxide containing base layer eliminates the driving force of Al diffusion from the cobalt aluminum layer into the tunnel barrier layer.

Reference is first made to FIG. 1, which illustrates an exemplary structure that can be employed in the present application, the exemplary structure includes a first electrode layer 12 located on an interconnect level 10. The interconnect level 10 includes at least one electrically conductive structure that is embedded in an interconnect dielectric material layer; the individual elements are not shown but are represented by element 10. The interconnect level 10 can be located above at least one underlying metal level (not shown) and a front-end-of-the-line (FEOL) level also not shown. In some embodiments, the metal level can be a middle-of-the line (MOL) level. In other embodiments, the metal level can be at least one lower interconnect level of a multi-level interconnect structure. In yet further embodiments, the metal level can be a combination of a MOL level and at least one lower interconnect level of a multi-level interconnect structure. The metal level can include electrically conductive structures embedded in a dielectric material layer. The FEOL can include a semiconductor substrate having one or more semiconductor devices (such as, for example, transistors) formed thereon. The interconnect level 10, the metal level and the FEOL level can be formed utilizing materials and techniques that are well known to those skilled in the art. So not to obscure the memory structure of the present application, the materials and techniques used in providing the interconnect level 10, the metal level and the FEOL level are not described in detail in the present application.

The first electrode layer 12 can be composed of a conductive material such as, for example, Ta, TaN, Ti, TiN, Ru, RuN, RuTa, RuTaN, Co, CoWP, CoN, W, WN or any combination thereof. In one example, the first electrode layer 12 is composed of Ta/TaN. The first electrode layer 12 is typically amorphous (i.e., lacking any well-defined crystal structure). The first electrode layer 12 can be formed utilizing a deposition process such as, for example, chemical vapor deposition (CVD) plasma enhanced chemical vapor deposition (PECVD), physical vapor deposition (PVP), atomic layer deposition (ALD), or sputtering. The first electrode layer 12 can have a thickness from 10 nm to 100 nm; however other thicknesses can be used as the thickness of the first electrode layer 12. Note that after a subsequently formed patterning process, the remaining, i.e., non-patterned, portion of the first electrode layer 12 would directly contact one of the electrically conductive structure present in the interconnect level 10.

Figure 2:
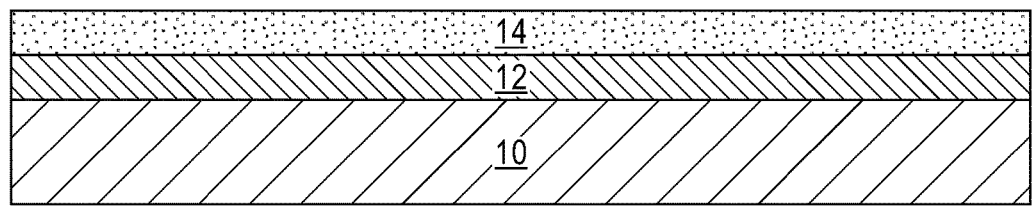
FIG. 2 is a cross sectional view of the exemplary structure shown in FIG. 1 after forming an amorphous template layer on the first electrode layer.

Referring now to FIG. 2, there is illustrated the exemplary structure shown in FIG. 1 after forming an amorphous template layer 14 on the first electrode layer 12. The amorphous template layer 14 can include any amorphous template material such as, for example, CoFeB or ZrCo. The amorphous template layer 14 can be formed utilizing a deposition process such as, for example, CVD, PECVD, PVD, ALD, or sputtering. The amorphous template layer 14 can have a thickness from 10 nm to 50 nm; however other thicknesses can be used as the thickness of the amorphous template layer 14.

Figure 3:
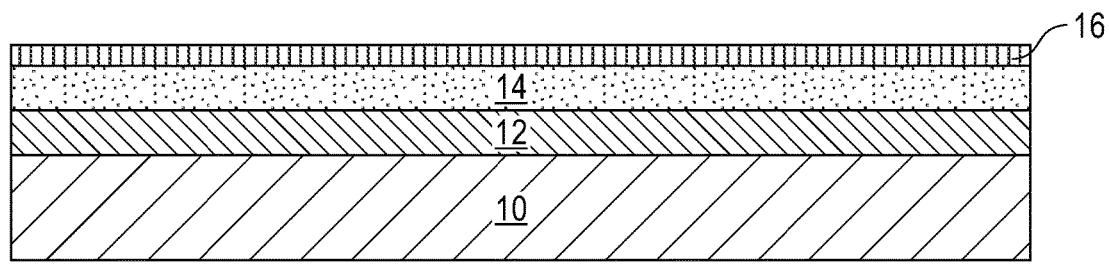
FIG. 3 is a cross sectional view of the exemplary structure shown in FIG. 2 after forming a MgO seed layer having a (100) crystal orientation on the amorphous template layer.

Referring now to FIG. 3, there is illustrated the exemplary structure shown in FIG. 2 after forming a MgO seed layer 16 having a (100) crystal orientation on the amorphous template layer 14. The MgO seed layer 16 has a face centered cubic crystal structure. The MgO seed layer 16 has a lattice constant of about 4.25 Å. The MgO seed layer 16 can be formed utilizing a deposition process such as, for example, CVD, PECVD, PVD, ALD, or sputtering. The MgO seed layer 16 can have a thickness from 5 nm to 50 nm; however other thicknesses can be used as the thickness of the MgO seed layer 16.

In some embodiments, and to improve the (100) crystal orientation of the MgO seed layer 16, an anneal can follow the deposition process. When employed, this 'textured enhancement' anneal can be performed under vacuum or in an inert ambient. The inert ambient can include helium, argon and/or nitrogen. The 'textured enhancement' anneal can be performed at a temperature from 200° C. to 550° C., but ideally temperatures below 450° C. are employed to avoid impacting other structures in the back end of line of the substrate wafer. The duration of the 'textured enhancement' anneal can vary. In one example, the duration of the 'textured enhancement' anneal is from 1 minute to 5 minutes.

Figure 4A:
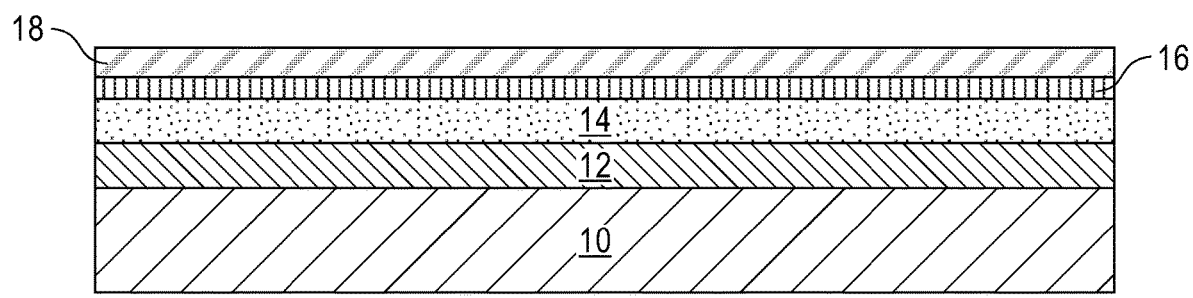
FIG. 4A is a cross sectional view of the exemplary structure shown in FIG. 3 after forming a magnesium-aluminum-oxide layer on the MgO seed layer.

Referring now to FIG. 4A, there is illustrated the exemplary structure shown in FIG. 3 after forming a magnesium-aluminum-oxide layer 18 on the MgO seed layer 16. The magnesium-aluminum-oxide layer 18 can be formed by a co-deposition process in which at least two target sources are employed; i.e., a first target source can be for MgO deposition and the second target source can be for $Al_2O_3$ deposition. The co-deposition process creates a continuous compositional gradient of magnesium-aluminum-oxide across the MgO seed layer 16. In this embodiment, the magnesium-aluminum-oxide layer 18 includes stoichiometric magnesium-aluminum-oxide having a formula $MgAl_2O_4$. The magnesium-aluminum-oxide layer has a (001) crystal orientation since it is grown upon the MgO seed layer 16 that facilitates the formation of the (001) texture. The as-deposited magnesium-aluminum-oxide layer 18 can have a thickness from 0.4 nm to 2 nm, although other as-deposited thicknesses are contemplated and can be employed in the present application as the as-deposited thickness of the magnesium-aluminum-oxide layer 18.

Figure 4B:
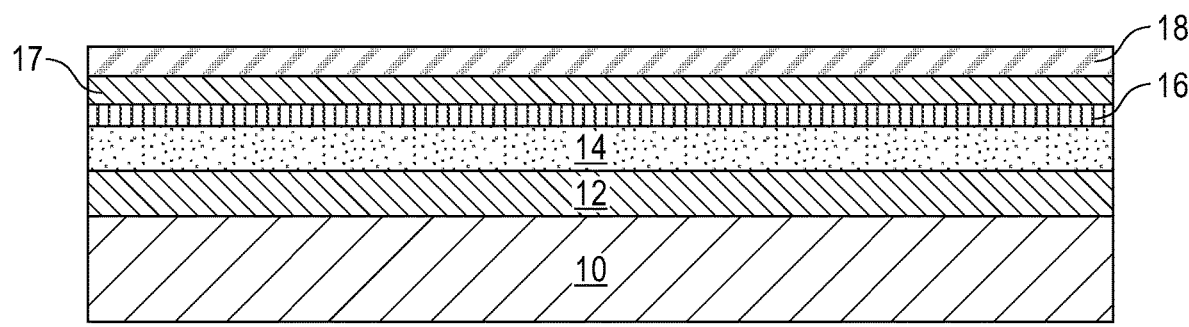
FIG. 4B is a cross sectional view of the exemplary structure shown in FIG. 3 after forming an aluminum layer and a magnesium-aluminum-oxide layer on the MgO seed layer.

Referring now to FIG. 4B, there is illustrated the exemplary structure shown in FIG. 3 after forming an aluminum layer 17 and a magnesium-aluminum-oxide layer 18 on the MgO seed layer 16. The aluminum layer 17 can be formed on the MgO seed layer 16 utilizing a deposition process including, for example, CVD, PECVD, PVD, ALD, or sputtering. The aluminum layer 17 has a (001) crystal structure. The as-deposited aluminum layer 17 can have a thickness from 0.1 nm to 1.5 nm, although other as-deposited thicknesses are contemplated and can be employed in the present application as the as-deposited thickness of the aluminum layer 17. The magnesium-aluminum-oxide layer 18 is formed as described above. The magnesium-aluminum-oxide layer has a (001) crystal orientation. The as-deposited magnesium-aluminum-oxide layer 18 can have a thickness from 0.4 nm to 2 nm, although other as-deposited thicknesses are contemplated and can be employed in the present application as the as-deposited thickness of the magnesium-aluminum-oxide layer 18. This embodiment is used to form a magnesium-aluminum-oxide containing base layer 19 that is non-stoichiometric; i.e., an aluminum rich magnesium-aluminum-oxide, as defined above, is formed. Notably, this embodiment is used to provide a magnesium-aluminum-oxide containing base layer 19 that includes an aluminum rich magnesium-aluminum-oxide having a formula $MgAl_yO_x$, wherein x is 1 to 1+1.5×y, and y is 1 to 4.

Figure 5:
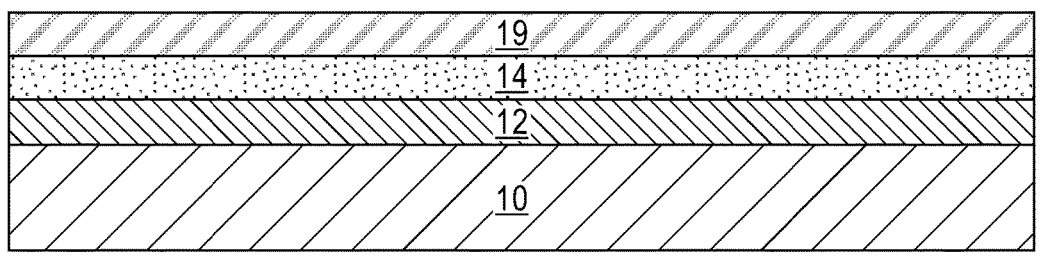
FIG. 5 is a cross sectional view of the exemplary structure shown in FIG. 4A after annealing wherein the annealing converts the MgO seed layer and the magnesium-aluminum-oxide layer into a magnesium-aluminum-oxide containing base layer.

Referring now to FIG. 5, there is illustrated the exemplary structure shown in FIG. 4A after annealing wherein the annealing converts the MgO seed layer 16 and the magnesium-aluminum-oxide layer 18 into a magnesium-aluminum-oxide containing base layer 19; the anneal can also be performed on the exemplary structure shown in FIG. 4B. The magnesium-aluminum-oxide containing base layer 19 has a (001) crystal orientation. In the illustrated embodiment, the magnesium-aluminum-oxide containing base layer 19 that is formed includes stoichiometric magnesium-aluminum-oxide. In some embodiments, the entirety of the magnesium-aluminum-oxide containing base layer 19 is composed of stoichiometric magnesium-aluminum-oxide. In other embodiments, the magnesium-aluminum-oxide containing base layer 19 is a composite layer containing an upper portion of stoichiometric magnesium-aluminum-oxide, and a lower portion that is composed of the MgO seed layer 16.

For the embodiment shown in FIG. 4B, the anneal converts the MgO seed layer 16, the aluminum layer 17, and the magnesium-aluminum-oxide layer 18 into a magnesium-aluminum-oxide containing base layer 19. The magnesium-aluminum-oxide containing base layer 19 has a (001) crystal orientation. In this embodiment, the magnesium-aluminum-oxide containing base layer 19 is non-stoichiometric, i.e., an aluminum rich magnesium-aluminum-oxide, as defined above, is formed. In some embodiments, the entirety of the magnesium-aluminum-oxide containing base layer 19 is composed of non-stoichiometric magnesium-aluminum-oxide. In other embodiments, the magnesium-aluminum-oxide containing base layer 19 is a composite layer containing an upper portion of non-stoichiometric magnesium-aluminum-oxide, and a lower portion that is composed of the MgO seed layer 16.

The anneal used in providing the exemplary structure shown in FIG. 5 can be performed under vacuum or in an inert ambient. The inert ambient can include helium, argon and/or other noble gases like Ne, Kr and Xe. The anneal can be performed at a temperature from 200° C. to 550° C., ideally temperatures of less than 450° C. are employed to avoid impacting the back end of line structures of the CMOS substrate wafer. The duration of the anneal can vary. In one example, the duration of the anneal is from 5 minute to 30 minutes. In some embodiments of the present application, this anneal can be performed after formation of the cobalt aluminum layer 20.

Figure 6:
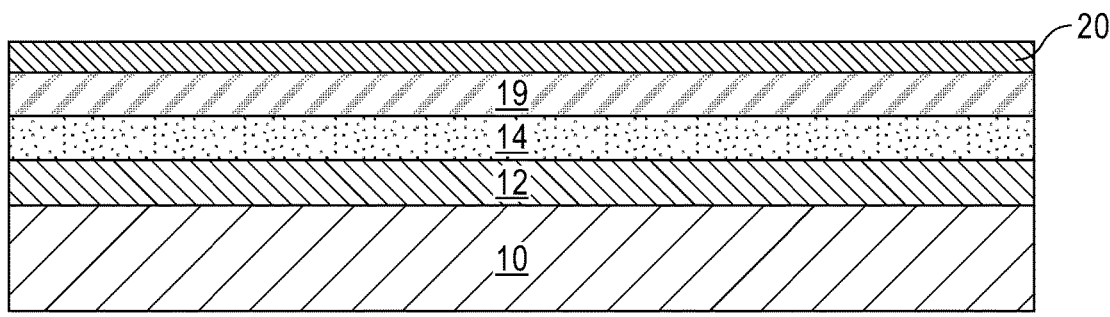
FIG. 6 is a cross sectional view of the exemplary structure shown in FIG. 5 after forming a cobalt aluminum layer on the magnesium-aluminum-oxide containing base layer.

Referring now to FIG. 6, there is illustrated the exemplary structure shown in FIG. 5 after forming a cobalt aluminum layer 20 on the magnesium-aluminum-oxide containing base layer 19. The cobalt aluminum layer 20 that is formed has a (001) crystal orientation and a lattice constant that is 4.03 Å. The cobalt aluminum layer 20 can be formed utilizing a deposition process such as, for example, CVD, PECVD, PVD, ALD, or sputtering. The cobalt aluminum layer 20 can have a thickness from 0.5 nm to 10 nm, typically between 2 nm and 5 nm; although other thicknesses are possible and can be used as the thickness of the cobalt aluminum layer 20. The (001) textured cobalt aluminum layer 20 of the present application permits the formation of a tensile strained magnetic free layer.

Figure 7:
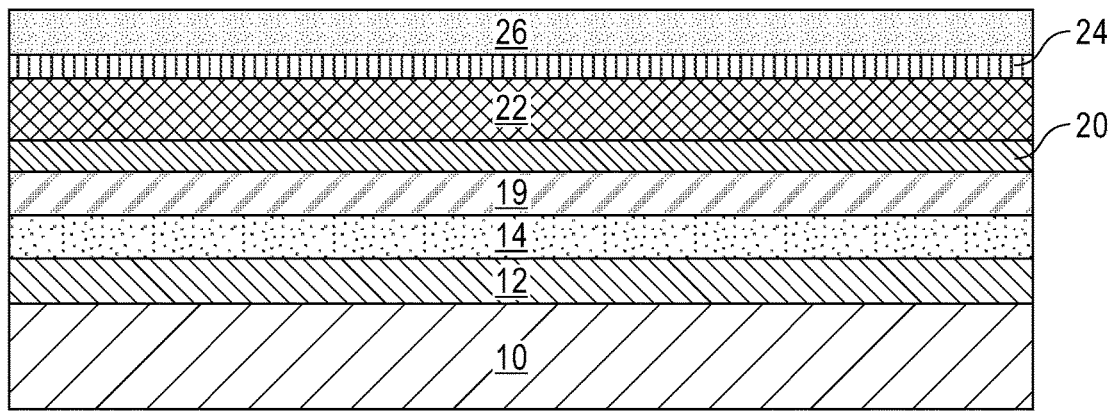
FIG. 7 is a cross sectional view of the exemplary structure shown in FIG. 6 after forming a magnetic free layer composed of an ordered magnetic alloy, a tunnel barrier layer and a magnetic reference layer on the cobalt aluminum layer.

Referring now to FIG. 7, there is illustrated the exemplary structure shown in FIG. 6 after forming a magnetic free layer 22, a tunnel barrier layer 24 and a magnetic reference layer 26 on the cobalt aluminum layer 20. The magnetic free layer 22 is composed of an ordered magnetic alloy and it forms an interface with the cobalt aluminum layer 20. The term "ordered magnetic alloy" as used throughout the present application denotes a magnetic alloy that has a lattice structure in which atoms of one element occupy particular sites and atoms of at least one other element occupy other sites. In one embodiment, the ordered magnetic alloy that provides the magnetic free layer 22 is a Heusler alloy. The term "Heusler alloy" is used herein to denote an intermetallic ternary compound of the formula $A_2BA$, which possesses the Heusler of half-Heusler crystal structure. Exemplary Heusler alloys that can be used in the present application include, but are not limited to, $Mn_3Ge$, $Mn_3Ga$, $Co_2MnSn$, $Co_2MnSi$, $Mn_3Sn$ or $Mn_3Sb$. The magnetic free layer 22 can have a thickness from 0.5 nm to 1.5 nm; although other thicknesses are possible and can be used as the thickness of the magnetic free layer 22. The magnetic free layer 22 is tensile strained due to the underlying cobalt aluminum layer 20.

The tunnel barrier layer 24 is composed of an insulator material and is formed at a thickness sufficient to provide an appropriate tunneling resistance. Exemplary insulator materials for the tunnel barrier layer 24 include, but are not limited to, magnesium oxide, aluminum oxide, and titanium oxide, or materials of higher electrical tunnel conductance, such as semiconductors or low-bandgap insulators. The thickness of the tunnel barrier layer 24 will depend on the material selected. In one example, the tunnel barrier layer 24 can have a thickness from 0.5 nm to 1.5 nm; although other thicknesses are possible as long as the thickness of the tunnel barrier layer 24 provides an appropriate tunneling resistance.

The magnetic reference layer 26 can be composed of can be composed of a magnetic metal or magnetic metal alloy, including iron (Fe), nickel (Ni), cobalt (Co), chromium (Cr), boron (B), or manganese (Mn). Exemplary magnetic metal alloys can include the magnetic metals exemplified by the above for the magnetic reference layer 26. In another embodiment, the magnetic reference layer 26 can be a multilayer arrangement having (1) a high spin polarization region formed of a metal and/or metal alloy using the metals mentioned above, and (2) a region constructed of a material or materials that exhibit strong PMA. Exemplary materials with strong PMA that can be used include a metal such as cobalt, nickel, platinum, palladium, iridium, or ruthenium, and can be arranged as alternating layers. The strong PMA region can also include alloys that exhibit strong intrinsic or bulk (as opposed to interface) PMA, with exemplary alloys including cobalt-iron-terbium, cobalt-iron-gadolinium, cobalt-chromium-platinum, cobalt-platinum, cobalt-palladium, iron-platinum, and/or iron-palladium. The alloys can be arranged as alternating layers. In one embodiment, the magnetic reference layer 26 can have a thickness from 1 nm to 15 nm; although other thicknesses are possible and can be used as the thickness of the magnetic reference layer 26. In some embodiments, the magnetic reference layer 26 is a multilayered structure, as shown in FIG. 8.

Each of the magnetic free layer 22, the tunnel barrier layer 24 and the magnetic reference layer 26 can be formed utilizing a deposition process such as, for example, CVD, PECVD, PVD, ALD, or sputtering.

Figure 8:
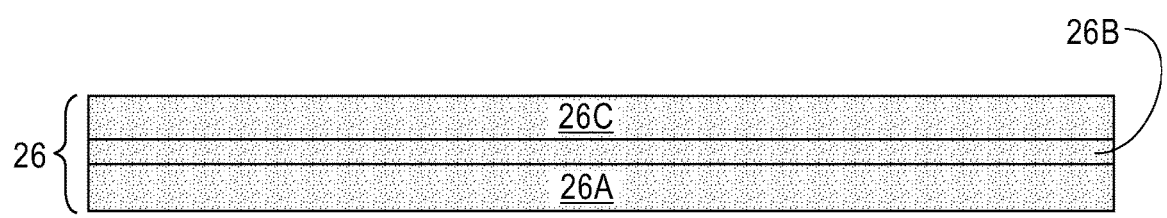
FIG. 8 is a cross sectional view of a magnetic reference layer that can be employed in accordance with an embodiment of the present application; in the illustrated embodiment the magnetic reference layer is a multilayered structure including a synthetic anti-ferromagnetic coupling layer sandwiched between a first magnetic reference layer and a second magnetic reference layer.

Referring now to FIG. 8, there is illustrated one type of magnetic reference layer 26 that can be employed in accordance with an embodiment of the present application; in the illustrated embodiment the magnetic reference layer 26 is a multilayered structure including a synthetic anti-ferromagnetic coupling layer 26B sandwiched between a first magnetic reference layer 26A and a second magnetic reference layer 26C.

In the illustrated embodiment shown in FIG. 8, the first magnetic reference layer 26A can be composed of can be composed of a magnetic metal or magnetic metal alloy, including iron (Fe), nickel (Ni), cobalt (Co), chromium (Cr), boron (B), or manganese (Mn). Exemplary magnetic metal alloys can include the magnetic metals exemplified by the above for the first magnetic reference layer 26A. In another embodiment, the first magnetic reference layer 26A can be a multilayer arrangement having (1) a high spin polarization region formed of a metal and/or metal alloy using the metals mentioned above, and (2) a region constructed of a material or materials that exhibit strong PMA. Exemplary materials with strong PMA that can be used include a metal such as cobalt, nickel, platinum, palladium, iridium, or ruthenium, and can be arranged as alternating layers. The strong PMA region can also include alloys that exhibit strong intrinsic or bulk (as opposed to interface) PMA, with exemplary alloys including cobalt-iron-terbium, cobalt-iron-gadolinium, cobalt-chromium-platinum, cobalt-platinum, cobalt-palladium, iron-platinum, and/or iron-palladium. The alloys can be arranged as alternating layers. In one embodiment, the first magnetic reference layer 26A can have a thickness from 1 nm to 15 nm; although other thicknesses are possible and can be used as the thickness of the first magnetic reference layer 26A.

The synthetic anti-ferromagnetic coupling layer 26B can be composed of non-magnetic material that can couple in an anti-parallel fashion the first and second magnetic free layers 26A, 26C of the multilayered structure illustrated in FIG. 8. Exemplary non-magnetic materials that can be used as the synthetic anti-ferromagnetic coupling layer 26B include, but are not limited to, ruthenium (Ru), iridium (Ir) or rhodium (Rh) or alloys of Ru, Ir or Rh with each other (e.g., RuIr with Ru or Ir composition from 0 to 100%). In one embodiment, the synthetic anti-ferromagnetic coupling layer 26B can have a thickness from 0.2 nm to 1.2 nm; although other thicknesses are possible and can be used as the thickness of the synthetic anti-ferromagnetic coupling layer 26B.

The second magnetic reference layer 26C can be composed of one of the magnetic materials mentioned above for the first magnetic reference layer 26A. In some embodiments, the magnetic material that provides the second magnetic reference layer 26C is compositionally the same as the magnetic material that provides the first magnetic reference layer 26A. In other embodiments, the magnetic material that provides the second magnetic reference layer 26C is compositionally different from the magnetic material that provides the first magnetic reference layer 26A. In one embodiment, second magnetic reference layer 26C can have a thickness from 1 nm to 15 nm; although other thicknesses are possible and can be used as the thickness of the second magnetic reference layer 26C.

Each of the first magnetic free layer 26A, the synthetic anti-ferromagnetic coupling layer 26B, and the second magnetic free layer 26C can be formed utilizing a deposition process such as, for example, CVD, PECVD, PVD, ALD, or sputtering.

Figure 9:
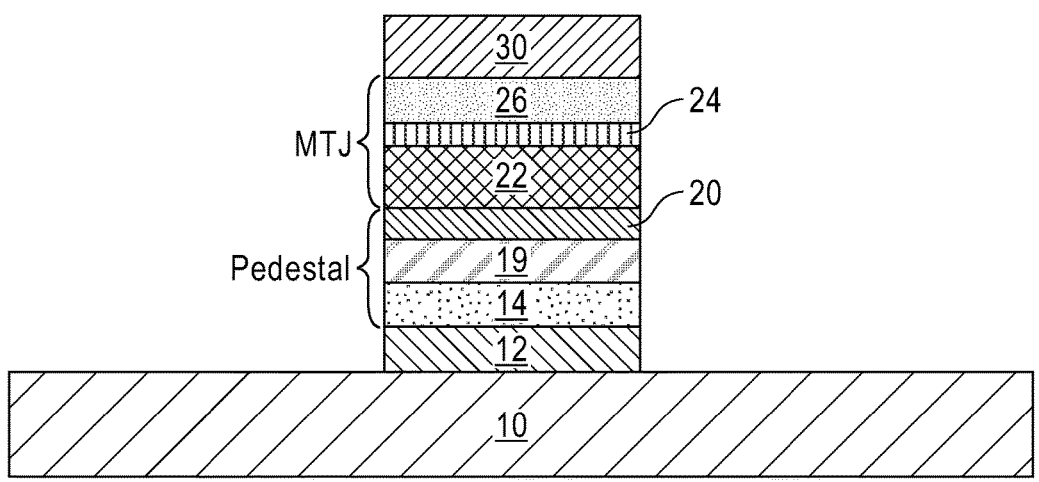
FIG. 9 is a cross sectional view of the exemplary structure shown in FIG. 7 after forming a second electrode layer and patterning the various materials to a MTJ pillar located on a pedestal structure in accordance with an embodiment of the present application.

Referring now to FIG. 9, there is illustrated the exemplary structure shown in FIG. 7 after forming a second electrode layer 30 and patterning the various materials to a MTJ pillar located on a pedestal structure in accordance with an embodiment of the present application. The second electrode layer 20 includes one of the materials mentioned above for the first electrode layer 12. The second electrode layer 20 can have a thickness within the range mentioned above for the first electrode layer 12 and the second electrode layer 20 can be formed utilizing one of the deposition process mentioned above in forming the first electrode layer 12.

Patterning includes lithography and etching. The etching can include for example, reactive ion etching or ion beam etching. The etching can be performed through the second electrode layer 20, the magnetic reference layer 26, the tunnel barrier layer 24, the magnetic free layer 22, the cobalt aluminum layer 20, the magnesium-aluminum-oxide containing base layer 19, the amorphous template layer 14 and the first electrode layer 12. At this point of the process, further memory device processing steps including formation of a dielectric material liner, forming of an interconnect dielectric layer, and forming another interconnect level including at least one electrically contact structure that physically contacts the remaining portion of the second electrode layer 26 can be performed.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A memory device comprising:
  a pedestal structure comprising a cobalt aluminum layer located on a first surface of a magnesium-aluminum-oxide containing base layer, the cobalt aluminum layer having a (001) crystal orientation; and
  a magnetic tunnel junction (MTJ) pillar located on the cobalt aluminum layer of the pedestal structure, the MTJ pillar comprising a magnetic free layer composed of an ordered magnetic alloy forming an interface with the cobalt aluminum layer of the pedestal structure.

2. The memory device of claim 1, wherein the pedestal structure further comprises an amorphous template layer located on a second surface of the magnesium-aluminum-oxide containing base layer, wherein the second surface of the magnesium-aluminum-oxide containing base layer is opposite the first surface of the magnesium-aluminum-oxide containing base layer.

3. The memory device of claim 2, further comprising a first electrode layer contacting the amorphous template layer, and a second electrode layer contacting the MTJ pillar.

4. The memory device of claim 3, wherein the first electrode layer is an amorphous Ta/TaN layered structure.

5. The memory device of claim 4, further comprising an interconnect level contacting a surface of the first electrode layer.

6. The memory device of claim 1, wherein the magnetic free layer is tensile strained.

7. The memory device of claim 1, wherein the magnesium-aluminum-oxide containing base layer comprises stoichiometric magnesium-aluminum-oxide having a formula $MgAl_2O_4$.

8. The memory device of claim 1, wherein the magnesium-aluminum-oxide containing base layer comprises an aluminum rich magnesium-aluminum-oxide having a formula $MgAl_yO_x$, wherein x is 1 to 1+1.5xy, and y is 1 to 4.

9. The memory device of claim 1, wherein the cobalt aluminum layer has a cubic crystal structure.

10. The memory device of claim 1, wherein the magnesium-aluminum-oxide containing base layer also has the (001) crystal orientation.

11. The memory device of claim 1, wherein the ordered magnetic alloy is Heusler alloy.

12. The memory device of claim 11, wherein the Heusler alloy comprises $Mn_3Ge$, $Mn_3Ga$, $Mn_3Sn$, $Mn_3Sb$, $Co_2MnSn$, or $Co_2MnSi$.

13. The memory device of claim 1, wherein the MTJ pillar further comprises a magnetic reference layer and a tunnel barrier layer, wherein the tunnel barrier layer is positioned between the magnetic free layer and the magnetic reference layer.

14. The memory device of claim 1, wherein the magnetic reference layer is a multilayered structure comprising a synthetic anti-ferromagnetic coupling layer sandwiched between a first magnetic reference layer and a second magnetic reference layer.

15. The memory device of claim 1, wherein the ordered magnetic alloy is $Mn_3Ge$, the magnesium-aluminum-oxide containing base layer comprises stoichiometric magnesium-aluminum-oxide having a formula $MgAl_2O_4$, and the MTJ pillar further comprises a magnetic reference layer and a tunnel barrier layer, wherein the tunnel barrier layer is positioned between the magnetic free layer and the magnetic reference layer, and wherein the magnetic reference layer is a multilayered structure comprising a synthetic anti-ferromagnetic coupling layer sandwiched between a first magnetic reference layer and a second magnetic reference layer, and further wherein both the magnesium-aluminum-oxide containing base layer and the cobalt aluminum layer have a (001) crystal orientation.

16. The memory device of claim 1, wherein the ordered magnetic alloy is $Mn_3Ge$, the magnesium-aluminum-oxide containing base layer comprises an aluminum rich magnesium-aluminum-oxide having a formula having a formula $MgAl_yO_x$, wherein x is 1 to 1+1.5×y, and y is 1 to 4, and the MTJ pillar further comprises a magnetic reference layer and a tunnel barrier layer, wherein the tunnel barrier layer is positioned between the magnetic free layer and the magnetic reference layer, and wherein the magnetic reference layer is a multilayered structure comprising a synthetic anti-ferromagnetic coupling layer sandwiched between a first magnetic reference layer and a second magnetic reference layer, and further wherein both the magnesium-aluminum-oxide containing base layer and the cobalt aluminum layer have a (001) crystal orientation.

17. A memory device comprising:

a pedestal structure comprising a cobalt aluminum layer located on a first surface of a magnesium-aluminum-oxide containing base layer; and a magnetic tunnel junction (MTJ) pillar located on the cobalt aluminum layer of the pedestal structure, the MTJ pillar comprising a magnetic free layer composed of manganese containing Heusler alloy and forming an interface with the cobalt aluminum layer of the pedestal structure, wherein both the magnesium-aluminum-oxide containing base layer and the cobalt aluminum layer have a (001) crystal orientation.

18. The memory device of claim 17, wherein the manganese containing Heusler alloy comprising one of $Mn_3Ge$, $Mn_3Ga$, $Mn_3Sn$, $Mn_3Sb$, $Co_2MnSn$, or $Co_2MnSi$.

19. The memory device of claim 17, wherein the magnesium-aluminum-oxide containing base layer comprises stoichiometric magnesium-aluminum-oxide having a formula $MgAl_2O_4$.

20. The memory device of claim 17, wherein the magnesium-aluminum-oxide containing base layer comprises an aluminum rich magnesium-aluminum-oxide having a formula $MgAl_yO_x$, wherein x is 1 to 1+1.5×y, and y is 1 to 4.

* * * * *